Feb. 21, 1928. 1,659,856
E. G. BUSSE
ADJUSTABLE BRAKE BEAM GUIDE
Filed Jan. 26, 1925     3 Sheets-Sheet 1
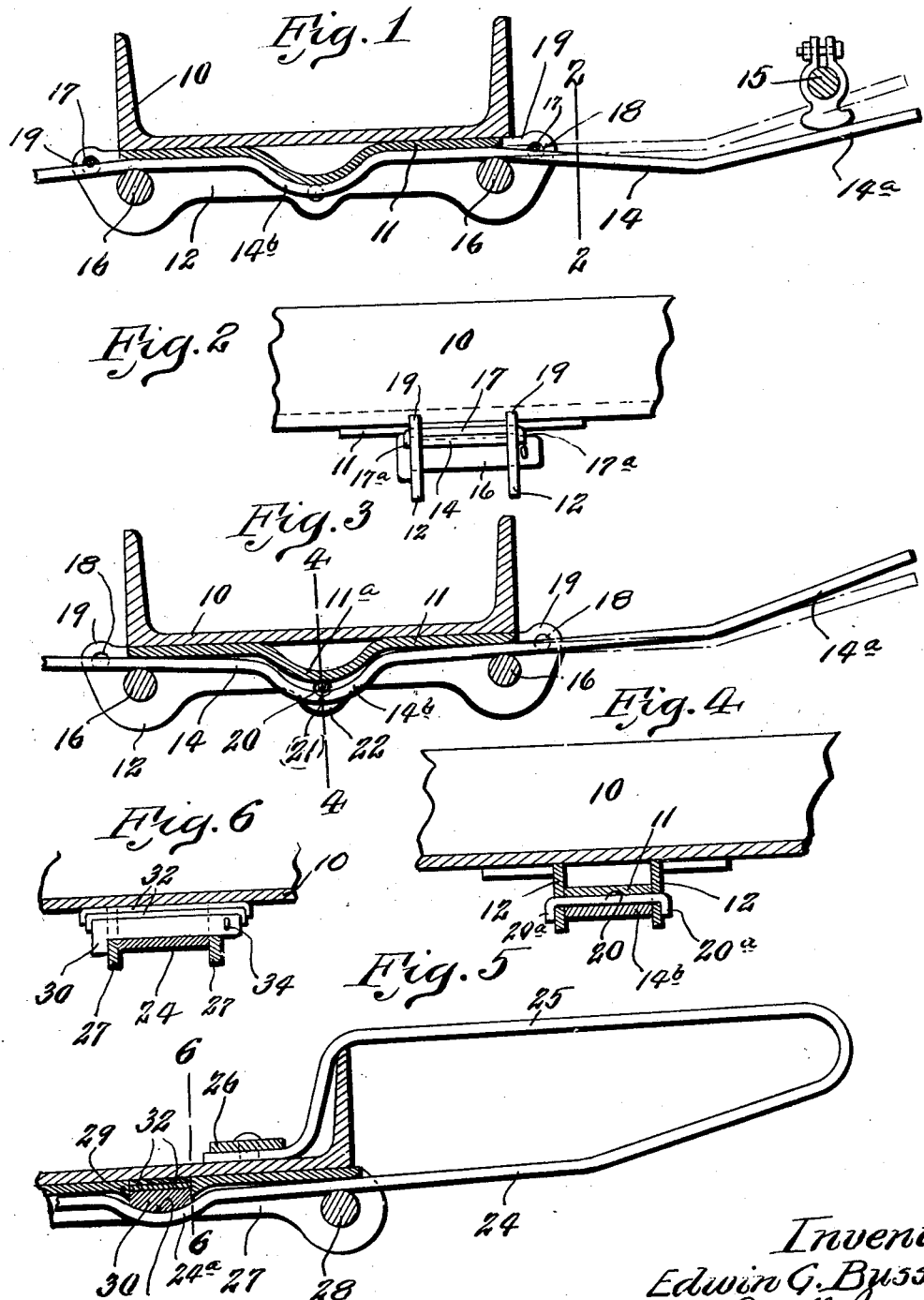
Inventor
Edwin G. Busse
By Cornwall, Bedell & Janus
Attys.

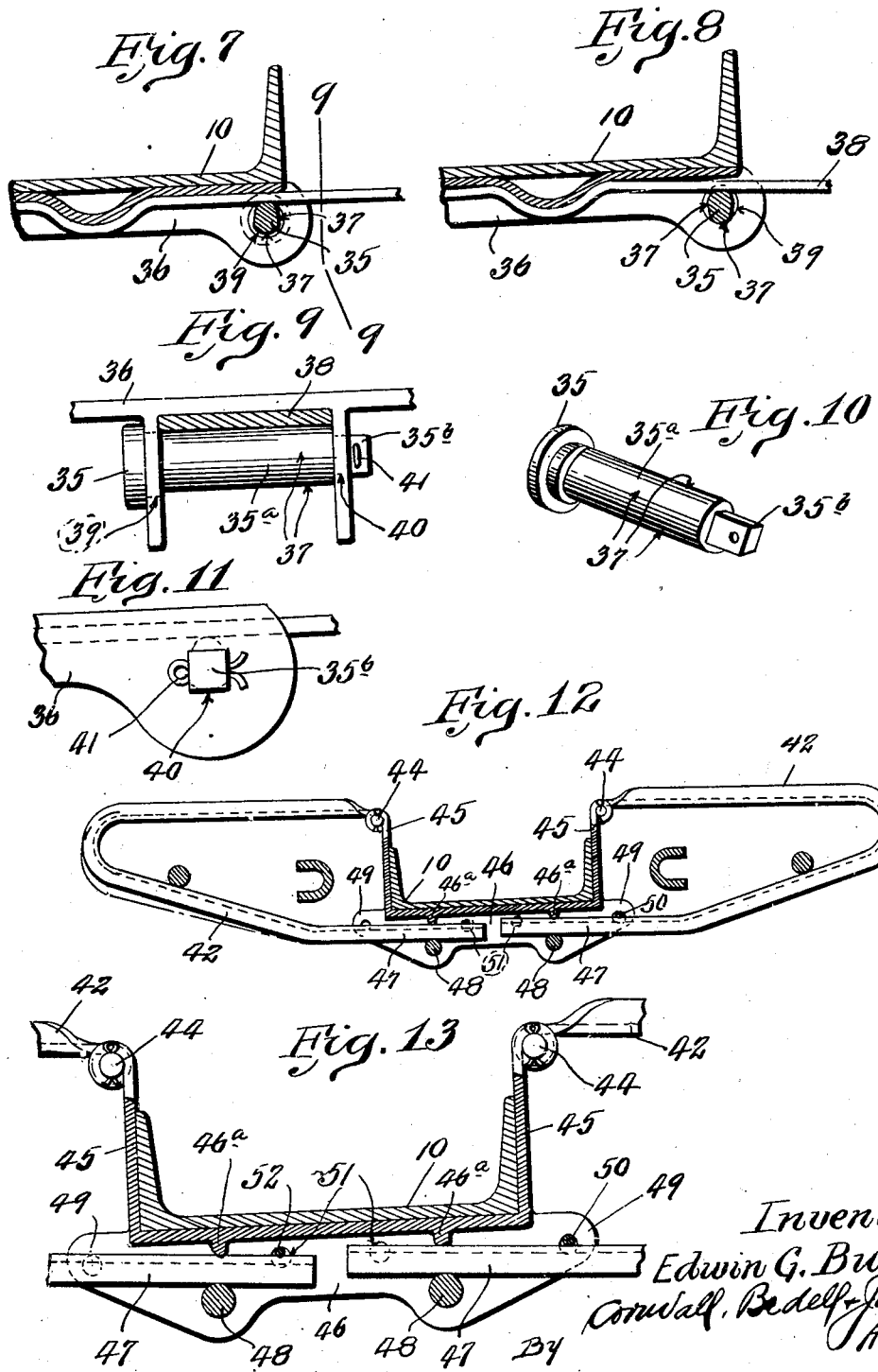

Feb. 21, 1928.
E. G. BUSSE
1,659,856
ADJUSTABLE BRAKE BEAM GUIDE
Filed Jan. 26, 1925     3 Sheets-Sheet 3
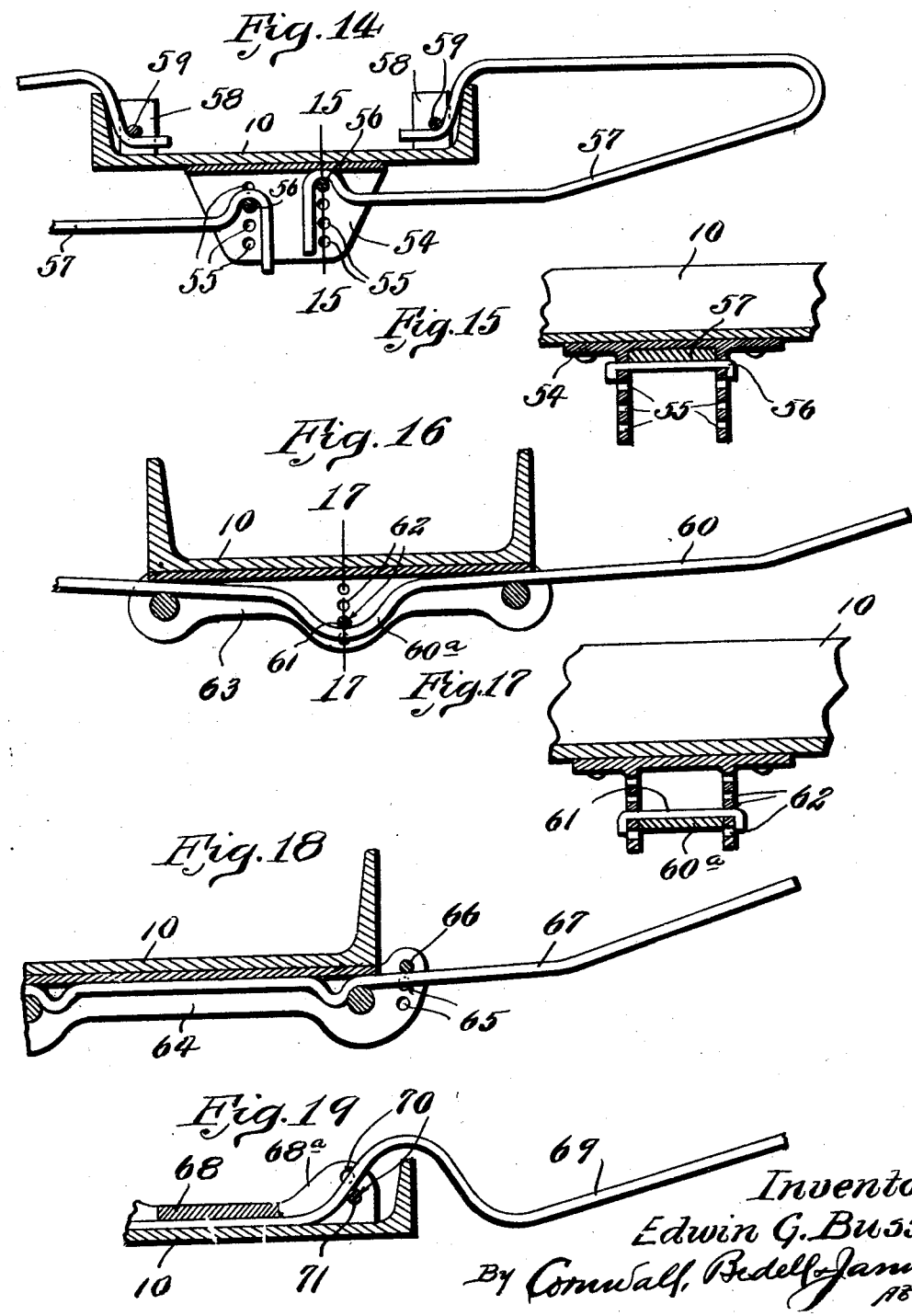

Patented Feb. 21, 1928.

1,659,856

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE BRAKE-BEAM GUIDE.

Application filed January 26, 1925. Serial No. 4,969.

My invention relates to new and useful improvements in brake beam supports and guides, the objects of the invention being to provide a support and guide which is adjustable in vertical plane in order to bring said support in proper operative relation with the corresponding brake beam.

Further objects of the invention are to provide a mounting for a brake beam support and guide, said mounting having an adjustable member adapted to engage said support and adjust it in a vertical plane whereby the corresponding brake beam is maintained in proper operative position.

With these and other objects in view, my invention consists in certain novel features of construction and arrangement of parts, hereinafter more fully described and claimed, and illustrated in the accompanying drawings, in which—

Figure 1 is a side elevational view of a support and guide and showing the same in depressed position.

Figure 2 is a vertical cross section taken on line 2—2 of Figure 1.

Figure 3 is a view similar to Figure 1 but showing the support and guide in raised position.

Figure 4 is a vertical cross section taken on line 4—4 of Figure 3.

Figure 5 is a side elevational view of a modified form of brake beam support and guide and showing modified means for moving said support and guide from normal position.

Figure 6 is a vertical cross section taken on line 6—6 of Figure 5.

Figure 7 is a side elevational view of a support and guide and showing a modified form of the means for adjusting said support in vertical plane.

Figure 8 is a similar view showing the support in lowered position.

Figure 9 is a vertical cross section taken one line 9—9 of Figure 7.

Figure 10 is a perspective detail view of a member removably mounted in the bracket and adjustable to position the support relative to the brake beam.

Figure 11 is an elevational fragmental view of the bracket showing one end of said adjustable member seated therein.

Figure 12 is a cross section taken transversely through a truck part and showing brake beam supports and guides extending therefrom in opposite directions, one of said supports occupying a raised position and the other of said supports occupying a lowered position.

Figure 13 is an enlarged detail view of the ends of said supports and the mounting therefor.

Figure 14 is a side elevational view of another modified form of support and adjustable mounting therefor.

Figure 15 is a vertical cross section taken on lines 15—15 of Figure 14.

Figure 16 is a side elevational view of another modified form.

Figure 17 is a vertical cross section taken on lines 17—17 of Figure 16.

Figures 18 and 19 show still other modified forms of adjusting the brake beam supports.

In the construction of car trucks, it frequently happens that due to the variances in the dimensions of the truck parts of the individual truck assemblies, the brake beams do not always lie in contact with the supports and guides where the latter have a fixed predetermined position. Therefore, it was found advisable to mount such supports and guides so that they can be readily adjusted relative to the brake beams by the car builder during the construction of the car truck. To accomplish this, I provide a member adjustably mounted in the bracket and engaging the brake beam support whereby the free end of said support can be adjusted in vertical plane so as to bring it into proper engagement with the respective brake beam.

Referring by numerals to the accompanying drawings, 10 indicates a truck part, such as a spring plank, to the underside of which are fixed at appropriate points brackets 11. Each bracket is formed with depending side portions 12 between which is arranged the central portion of a support and guide 14 which is disposed transversely of the spring plank and has its free ends 14$^a$ extending under a brake beam 15 or part thereof. Pins 16 are seated in suitable apertures formed in said portions 12 and bear against the underside of the support and hold it in position in the bracket. A transversely curved portion 14$^b$ is formed in the central portion of support 14 and is in nested relation with a similarly formed portion 11$^a$ of bracket 11 so that support 14 is held against accidental longitudinal movement.

In order to vary the position of the free ends of support 14 which support the respective brake beams, a pin seated in suitable apertures formed in side portions of the bracket is disposed transversely of the support and to one side of the pin 16 and bears against said support and holds it in proper position. When it is desired to depress the free end 14ª, as shown in Figure 1, a pin 17 is passed through apertures 18 formed in ears 19 of bracket 11 and engages the upper face of said support and holds it in depressed position. The degree of depression of end 14ª can be regulated by the size of pin 17 used for that purpose. By providing member 17 of larger cross section, the free end 14ª will be forced to occupy a more depressed position.

When it is desired to raise the free end 14ª of the support, a pin 20 is seated in coinciding apertures 21 formed in centrally disposed extensions or ears 22 of bracket 11. In inserting pin 20 in apertures 21, the central portion 14ᵇ of support 14 is forced downwardly, thereby raising the ends 14ª, as shown in Figure 3. The cross sectional area of member 20 can be varied to determine the extent of upward adjustment of ends 14ª. Apertures 18 and 21 are comparatively large in order to permit the reception of adjusting members of various cross sections. When members 17 and 20 are placed in position, their ends may be bent as indicated at 17ª and 20ª, respectively, to prevent the displacement of said members.

The modified form shown in Figures 5 and 6 comprises a support 24 having a rebent portion 25 disposed above the brake beam and having its extreme end held in position on the upper face of the spring plank by a strap 26. A bracket 27 is secured to the underside of the spring plank and receives pins 28 which hold the support in position in the bracket. The central portion of bracket 27 is cut away as indicated at 29 to form a seat for receiving a removable block 30 having a transversely curved face 31 which is adapted to engage the curved portion 24ª of support 24 so as to prevent longitudinal movement thereof. By inserting shims 32 between the upper face of block 30 and the underside of spring plank 10, the central portion 24ª of support 24 can be forced outwardly, thereby tilting upwardly the track portions 24ᵇ and rebent portions 25, block 30 may be held in position by a cotter pin 34.

In the form disclosed in Figures 7 to 11, a pin 35 is removably seated in each end of a bracket 36 and is provided in its shank portion 35ª with two or more faces 37 which are disposed unequal distances from the axis thereof whereby said member can be positioned so as to present any one of said faces in supporting contact with a support and guide 38 and thereby raising or lowering the free end 38 thereof accordingly. Aperture 39 through which the shank portion 35ª passes is round and of sufficient diameter to accommodate member 35 in any one of its positions. The other opening 40 which receives the square end 35ᵇ of member 35 is formed square and serves to hold member 35 in any one of its adjusted positions. Member 35 is locked against withdrawal by a cotter pin 41 passing through the square end 35ᵇ.

In the modified form shown in Figures 12 and 13, a rigid loop support 42 is pivotally connected at 44 to an extension 45 of bracket 46 which is fixed to the spring plank in the usual manner. The opposite end 47 of said support extends under the spring plank and rests on a pin 48 which is carried by the bracket 46. Depending from bracket 46 and disposed immediately above and preferably in vertical alignment with the axis of pin 48 is a transversely disposed rib 46ª which bears on the upper face of end 47 of support 42. In this manner, said end 47 is spaced from the bracket so that support 42 may be tilted downwardly or upwardly, using pin 48 or rib 46ª as a fulcrum. In order to hold each support 42 in tilted position, bracket 46 is provided at its ends with apertured lugs 49, each of which is adapted to receive a pin 50 which, when seated, engages the upper face of the support 42 when the latter occupies depressed position and locks said support in this position. Bracket 46 is further provided with aligned apertures 51 disposed inwardly of the fulcrum points and adapted to receive pins 52 which lock the support in upward position. Thus the brake beam guide or support can be easily adjusted by the car builder so as to bring it in proper operative relation with the brake beam. No material structural changes are necessary in the support or in the brake beam and only a slight change is required in the bracket to receive the locking pins or members which bear against the support. The adjustments can be readily made with the brake beam in position and the support when adjusted is held positively and securely in its position.

In the form shown in Figures 14 and 15, a bracket 54 secured to the spring plank 10 is provided in its depending sides with a series of coinciding apertures 55 disposed in vertical rows, whereby a pin 56 engaging the lower end of a resilient loop member 57 can be inserted in any pair of said apertures so as to bring said member in proper elevation. The opposite end of member 57 is anchored to a bracket 58 by means of a pin 59.

The modified form shown in Figures 16 and 17 discloses a track or support member 60 adjustable in vertical plane by a pin 61 which engages the central portion 60ᵃ of member 60 and is adapted to be seated in any pair of coinciding apertures 62 in a bracket 63. Thus member 60 can be tensioned to raise or lower the free ends thereof which extend under the brake beams.

In the form shown in Figure 18 a bracket 64 is provided near its ends with apertures 65 for receiving a pin 66 so that each end of member 67 can be adjusted separately.

In Figure 19 is shown another modified form wherein a bracket 68 is fixed to the top of the spring plank and holds a member 69 in position thereon. This bracket has ears 68ᵃ in which are formed apertures 70 for receiving a pin 71 which engages said member 69 and adjusts the ends thereof.

Obviously, various changes in the construction and form of my adjustable brake beam support and guide can be made without departing from the spirit of my invention.

I claim:

1. A third or fourth point support for brake beams comprising a bracket adapted to be fixed to a car truck part, a removable track member carried by said bracket and extending therefrom into brake beam engaging position, and a pin seated in said bracket transversely of and bearing against said track member whereby the outer portion of the latter is held in desired position.

2. In an adjustable support for brake beams, the combination of a track member, a bracket for receiving said track member, pins disposed transversely in said bracket for supporting said track member, and an element seated in said bracket and engaging said track member at a point spaced from said supporting pins, said element being adapted to depress or raise the central portion of said track member, thereby raising or depressing the ends of said track member correspondingly.

3. In a brake beam support, a bracket adapted to be carried by a car track part, a track member, elements carrying said track member in said bracket and removable therefrom, said bracket being provided with a series of seats on opposite sides of said element, and a member adapted to be inserted in any one of said seats for engaging said track member and adjusting the position of the outer portion thereof.

4. In a brake beam support, a bracket adapted to be fixed to a car truck part, a support member, an element on said bracket for carrying said member, said member and element being removable from said bracket, and means on said bracket for adjusting the vertical position of the outer portion of said member.

5. In combination, a car truck part, a bracket fixed thereto, a beam support member carried by said bracket and removable therefrom, and means on said bracket for varying the height of the outer portion of said support member.

6. In a brake beam support, a bracket adapted to be fixed to a truck part, a support member, a member carrying element on said bracket, and means on said bracket for adjusting the vertical position of the outer portion of said member, said member and element being removable from said bracket without removal of said means.

7. In an adjustable support for brake beams, the combination of a beam support track member, a bracket for receiving said track member, means disposed transversely in said bracket for supporting said track member, and an element seated in said bracket and engaging said track member at a point spaced from said supporting means, said element being adapted to lower or raise a portion of said track member, thereby raising or lowering the beam supporting portion of said track member correspondingly.

In testimony whereof I hereunto affix my signature this 10th day of January, 1925.

EDWIN G. BUSSE.